(12) United States Patent
Danielsen et al.

(10) Patent No.: US 8,265,163 B2
(45) Date of Patent: Sep. 11, 2012

(54) VIDEO SHAPE PADDING METHOD

(75) Inventors: Carl M. Danielsen, Lake Zurich, IL (US); Robert S. Chen, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2899 days.

(21) Appl. No.: 10/036,910

(22) Filed: Dec. 21, 2001

(65) Prior Publication Data

US 2003/0117416 A1 Jun. 26, 2003

(51) Int. Cl.
*H04N 11/04* (2006.01)
*H04N 7/12* (2006.01)
*G06K 9/36* (2006.01)

(52) U.S. Cl. ......... 375/240.24; 375/240.08; 375/240.09; 382/238; 382/236

(58) Field of Classification Search .......... 375/240.01–240.03, 240.11–240.17, 375/240.23, 240.24, 240.25, 240.26
See application file for complete search history.

(56) References Cited

U.S. PATENT DOCUMENTS

| 6,078,694 | A | * | 6/2000 | Takahashi et al. | 382/238 |
| 6,259,732 | B1 | * | 7/2001 | Lee | 375/240 |
| 6,377,309 | B1 | * | 4/2002 | Ito et al. | 348/554 |
| 6,625,212 | B1 | * | 9/2003 | Chen et al. | 375/240.08 |
| 6,665,340 | B1 | * | 12/2003 | Kimoto | 375/240.08 |
| 6,690,835 | B1 | * | 2/2004 | Brockmeyer et al. | 382/236 |
| 2003/0043907 | A1 | * | 3/2003 | Nakayama | 375/240.08 |
| 2004/0028129 | A1 | * | 2/2004 | Nagumo et al. | 375/240.08 |

OTHER PUBLICATIONS

Christoph Meer and Kay Migge; "*VLSI Hardware accelerator for the MPEG-4 padding algorithm*"; Part of the IS&T/SPIE Conference on Media Processors 1999, San Jose, California, Jan. 1999; SPIE vol. 3655; pp. 113-119.

* cited by examiner

*Primary Examiner* — Joseph Ustaris
*Assistant Examiner* — Frederick Bailey
(74) *Attorney, Agent, or Firm* — Susan R. Payne

(57) ABSTRACT

Horizontal and vertical video shape padding (with or without attendant motion compensation) are facilitated through use of a two-dimensional small array of processing elements. Multiple pixel value assignments are determined and made with each clock cycle or iteration, thereby greatly reducing overall cycle time to complete the shape padding. This approach is compatible with MPEG 4.

25 Claims, 4 Drawing Sheets

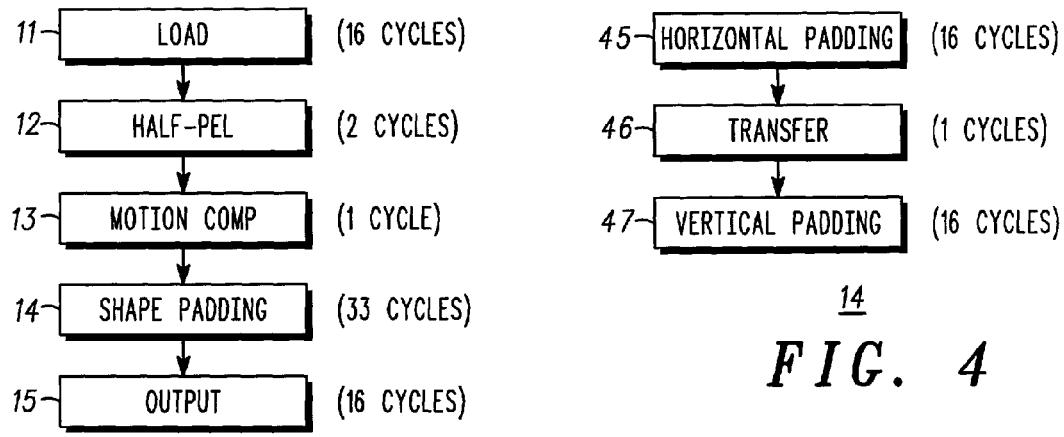
FIG. 1
FIG. 4
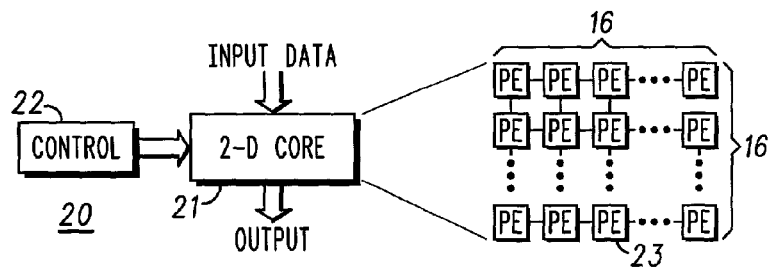
FIG. 2
FIG. 3
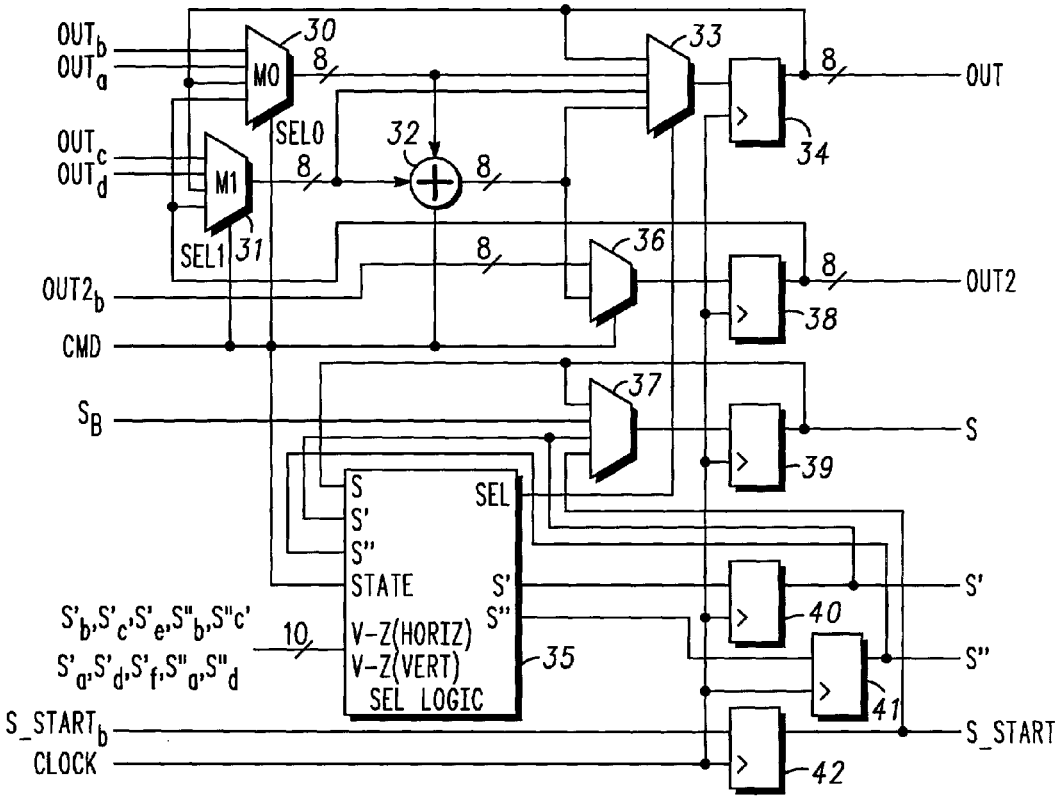

VIDEO SHAPE PADDING METHOD

TECHNICAL FIELD

This invention relates generally to processing of video information and particularly to shape padding.

BACKGROUND

Some video processing standards, such as MPEG 4, require that decoders of arbitrarily-shaped objects be capable of shape padding (either with or without motion compensation). Briefly stated, shape padding serves to define pixel values for pixels that are outside the confines of a specific shape. Though not explicitly used as displayable content, such padded pixel values are important to facilitate other video processing steps.

To date, shape padding (for MPEG 4) has been proposed, in general, in a relatively one-dimensional fashion. Pixels are read row by row, with padding being performed based on values in the whole row. While this approach can be satisfactorily supported in some instances, there are applications (such as high-definition television) where present technology would be greatly stressed. The number of iterations (and corresponding clock cycles) required to support such methodologies with many video formats is oppressively large. For example, to support high-definition television, these prior art approaches may require seven or eight billion operations per second to do shape padding in a useful real-time context. Meeting such copious processing requirements adversely impacts cost, power consumption, form factor size, and so forth.

A need therefore exists for a way to accomplish shape padding that at least improves upon some of these concerns. Preferably, shape padding should be both cost-effective and able to keep pace with high-end video processing needs such as high-definition television. If possible, the solution should be readily amenable to present integrated circuit processing techniques.

BRIEF DESCRIPTION OF THE DRAWINGS

These needs and others are substantially met through provision of the video shape padding method described herein. These and other benefits will become more clear upon making a thorough review and study of the following detailed description, particularly when reviewed in conjunction with the drawings, wherein:

FIG. 1 comprises an overall flow diagram configured in accordance with an embodiment of the invention;

FIG. 2 comprises a high-level block diagram depiction of an apparatus configured in accordance with an embodiment of the invention;

FIG. 3 comprises a schematic view of a processing element as configured in accordance with an embodiment of the invention;

FIG. 4 comprises a detailed flow diagram configured in accordance with an embodiment of the invention;

DETAILED DESCRIPTION

Figure 5:
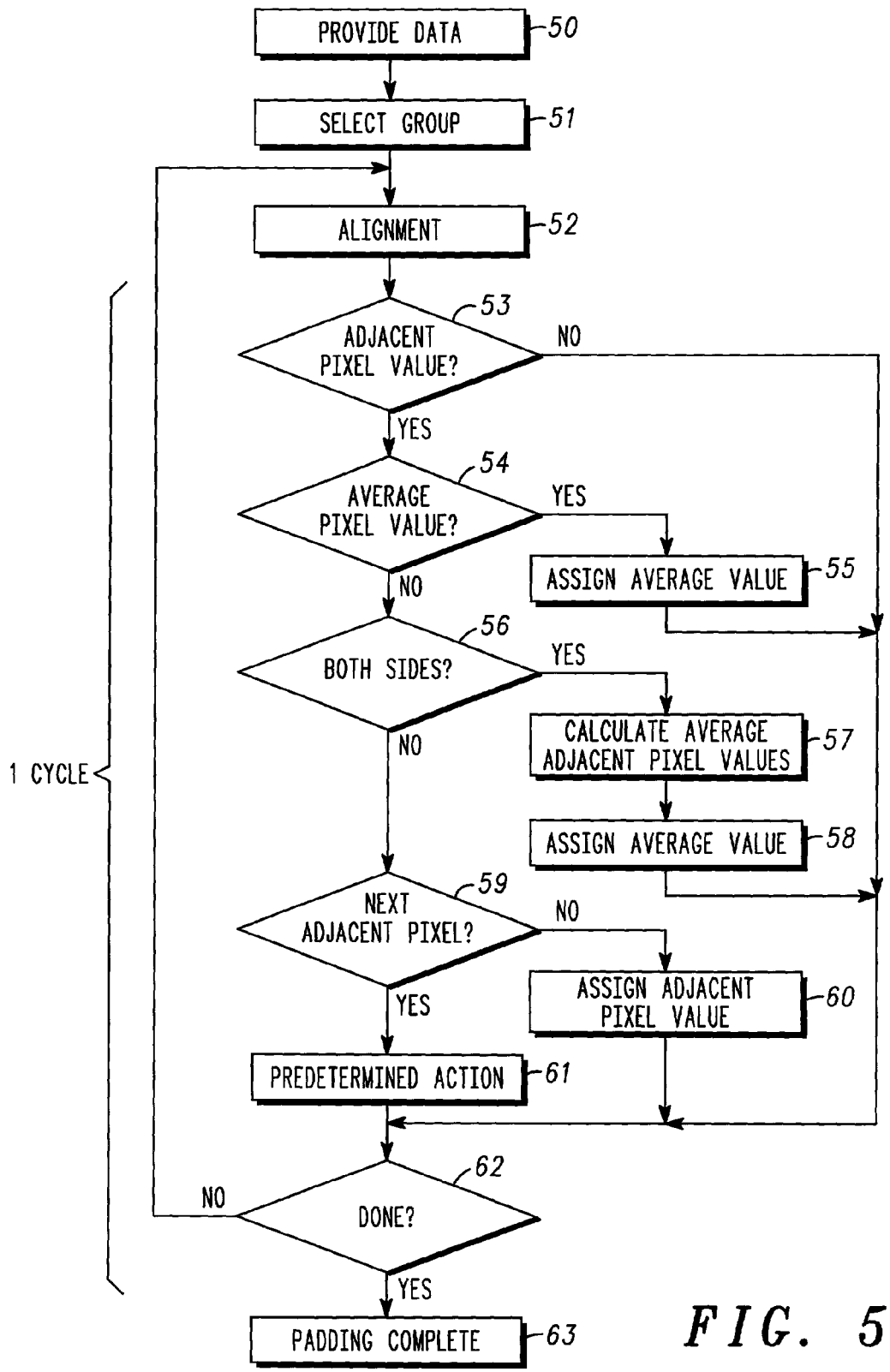
FIG. 5 comprises a detailed flow diagram configured in accordance with an embodiment of the invention.

Pursuant to various embodiments described below, video object plane data, which may consist both of object pixels (that is, pixels having a predetermined state in accordance with well understood prior art technique) and non-object pixels (that is, pixels not having the predetermined state), is provided for shape padding. A group of the object pixels and non-object pixels (which usually will be a predefined array of pixels comprising only a part of the complete data set but can, in an appropriate application, comprise the complete data set itself is selected and new padding pixel values are substantially simultaneously determined for a plurality of non-object pixels within this selected group. These new padding pixel values are selected by taking into account neighboring pixel values. Depending upon whether the process is facilitating horizontal or vertical shape padding, horizontal neighbors or vertical neighbors are taken into account, respectively. By substantially simultaneously making this determination for a plurality of non-object pixels, a large number of new pixel values can be determined within a single clock cycle. For example, a 16 by 16 array of new and complete pixel values can be determined within 33 clock cycles. This constitutes a dramatic difference from present prior art technique and will readily support high-end video processing, including high-definition television processing, with readily achievable and cost effective processing solutions.

It will also be shown that motion compensation can be effected in conjunction with shape padding, thereby saving additional hardware/processing requirements and processing time.

These teachings are also completely compatible with present MPEG 4 standards and requirements.

Referring now to the drawings, FIG. 1 depicts an overall process in accordance with various embodiments of the invention. Video object plane information is loaded 11. Such video object plane information includes object pixels wherein each of the object pixels has a corresponding pixel value. The video object plane information also includes, typically, one or more non-object pixels. The object pixels are differentiated from the non-object pixels by a discernible state condition as well understood in the art. Following loading 11, half-pel calculations are effected 12. Typically, such calculations occur in two cycles. One cycle supports horizontal calculations and the second cycle supports vertical calculations. Such half-pel calculations are generally understood in the art and therefore will not be described further here for the sake of clarity and brevity.

The process then effects motion compensation 13 and shape padding 14. As will be shown below, both motion compensation and shape padding can be effected through use of a common array of processing elements. The resultant output can then be provided 15 for subsequent use in accordance with well understood prior art technique.

Referring now to FIG. 2, a two dimensional array architecture well supports these processing steps. The basic architecture 20 comprises a two dimensional core 21 that is comprised of an array of individual processing elements 23. In this particular embodiment, the array comprises a 16 by 16 array of such processing elements 23. Such an array can accommodate a macro block consisting of a 16 by 16 array of corresponding pixels. Control logic 22 facilitates the operation of the two dimensional core 21. Incoming data (this being the video object plane data noted above) enters the two dimensional core with motion compensated and shape padded video object plane data emerging as the output.

Referring now to FIG. 3, one embodiment of an individual processing element 23 will be described in more detail.

Figure 6:
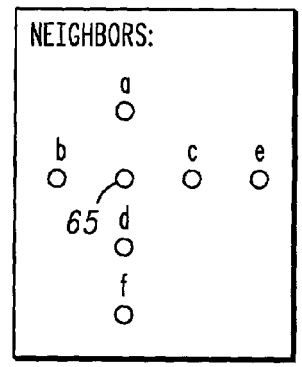
FIG. 6 comprises an illustrative depiction of pixels that neighbor a particular pixel.

Each processing element 23 comprises a plurality of multiplexers, latches, a summer, and a selection logic block. The controller 22 (see FIG. 2) controls the operation of the processing element 23 via the cmd line. Three bit control words control the state of the selection logic and the respective output of the various multiplexers. A clock signal is provided on the clk line. Pixel values for neighboring pixels are provided as inputs to two of the multiplexers 30 and 31 (with momentary reference to FIG. 6, and presuming that this processing element 23 services the pixel denoted by reference numeral 65, reference character "a" denotes the neighboring pixel vertically above, reference character "b" denotes the neighboring pixel horizontally to the left, reference character "c" denotes the neighboring pixel horizontally to the right, reference character "d" denotes the neighboring pixel vertically below, reference character "e" denotes the next adjacent neighboring pixel horizontally to the right, and reference character "f" denotes the next adjacent neighboring pixel vertically below—this reference character convention is utilized in FIG. 3 to indicate the particular pixel that corresponds to the value, value propagated, average propagated, and so forth).

A first latch 34 provides pixel value information "out" for the pixel that corresponds to this particular processing element 23. Another latch 38 provides difference information "out2." The information from these latches (in cooperation with the multiplexers 30 and 31 that receive pixel value information from neighboring pixels and the adder 32) can be readily utilized to effect motion compensation in accordance with well understood prior art technique. In particular, motion compensation can be performed simply by adding "out2" and "out." As a result, the basic two dimensional core architecture that facilitates shape padding will also facilitate motion compensation. This dual use functionality contributes both to reduced processing time and reduced hardware requirements.

One latch 39 provides shape mask information s, another latch 40 provides value propagated information s', and a third latch provides average value propagated information s". The use of these values will become more clear below. Another latch 42 provides a signal s_start that can be used for video object plane extension purposes.

The following table illustrates various correlated relationships between various commands, variables, inputs, and outputs as pertain to this embodiment.

TABLE 1

| State | ' | " | 4sel | ' | " | comment |
|---|---|---|---|---|---|---|
| | | | | | | Load pixel data |
| | ' | " | | | | Perform half-pel calculation |
| | ' | " | | | | Motion Compensate |
| | ' | | | | | Transfer s' to s |
| | | | | | | Transfer s to s_start |
| | ' | " | | | | Transfer out2 to out |
| | | | | | | not possible (undefined state) |
| | | | | | | Within shape (do nothing) |
| | | | | | | No adjacent shape pixels |
| | | | | | | Adjacent shape pixel (right or bottom) |
| | | | | | | Adjacent shape pixel (left or top) |
| | | | | | | Use average (even number of non-shape pixels) |

TABLE 1-continued

| State | ' | " | 4sel | ' | " | comment |
|---|---|---|---|---|---|---|
| | | | | | | Use average (odd number of non-shape pixels) |
| | | | | | | not possible (undefined state) |
| | | | | | | No average pixel adjacent |
| | | | | | | Use average on right or bottom |
| | | | | | | Use average on left or top |
| | | | | | | not possible (undefined state) |
| | | | | | | Average value already set (do nothing) |

So configured, and as described below in more detail, each processing element 23 will function, with each clock cycle, to assess neighboring pixel values and to establish a new padding pixel value for itself pursuant to various rules and conditions. In the operating embodiments about to be described, and with reference to FIG. 4, the process will first effect horizontal padding 45. The process will then transfer 46 and effect vertical padding 47. This order reflects MPEG 4 standards. These embodiments are not limited to such an order, however. If desired, the process could begin with vertical padding and then switch to horizontal padding. Also, if a particular application demanded, padding could proceed back and forth between horizontal and vertical padding.

Referring now to FIG. 5, data is provided 50 as described above. A group within this data is then selected 51. Within the context of an MPEG 4 embodiment, this group would constitute a macro block. The size of the group may be as large as the array of processing elements 23. For example, if the array were sufficiently large to accept the entire frame of data, then the entire frame could be processed at once. More typically, however, and especially given the great efficiency of the embodiment described above, such a large array need not be provided to effect rapid overall processing time. Instead, smaller blocks, such as a 16 by 16 block of adjacent pixels, are readily accommodated by the two dimensional core architecture 21 described above.

An alignment is then selected 52. For example, and as noted above, horizontal processing can be selected first with vertical processing to follow.

The process then functions to determine, with each cycle, a new padding pixel value for each non-object pixel in the selected group. These new padding pixel values are determined as a function of neighboring pixel values (both immediately adjacent pixel values and, in some embodiments, next adjacent neighboring pixel values).

Figure 7:
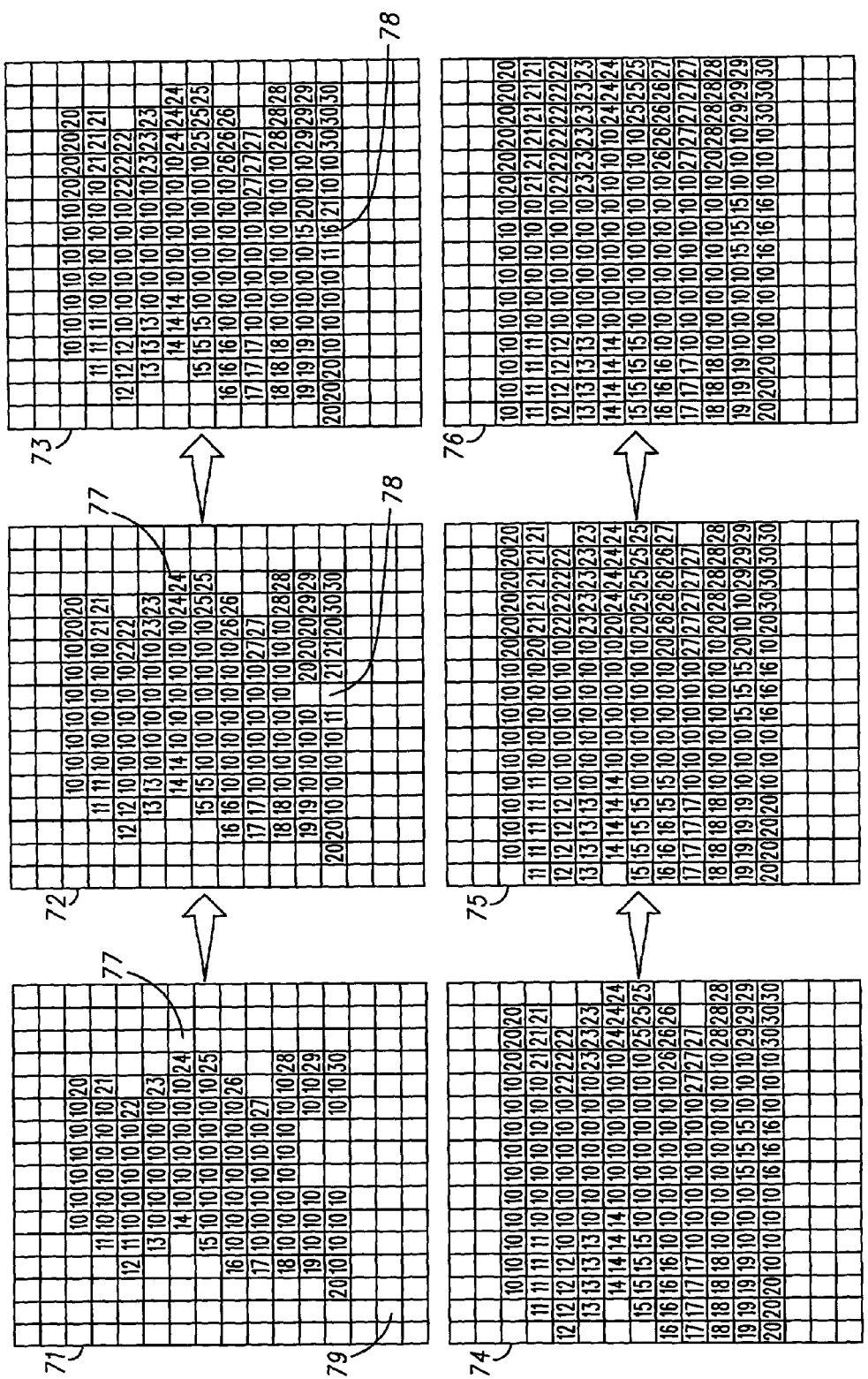
FIG. 7 comprises a sequence of an array of pixels undergoing horizontal padding in accordance with an embodiment of the invention.

The process determines 53 whether the present non-object pixel has an adjacent pixel that is either an object pixel having a corresponding pixel value or a non-object pixel having a new padding pixel value (when aligned horizontally, only horizontally adjacent pixels are considered and when aligned vertically, only vertically adjacent pixels are considered). If not, the process concludes for this cycle. In this event, a new padding pixel value is not adopted for the present non-object pixel. For example, and referring momentarily to FIG. 7, in an initial starting condition 71, a non-object pixel represented by reference numeral 79 does not have any horizontally adjacent pixels that meet this criteria. Consequently, this particular pixel 79 remains without a new padding pixel value as shown in the second block 72 following one cycle of the process.

Referring again to FIG. 5, when the present non-object pixel does have an adjacent pixel value, the process determines 54 whether that pixel value comprises a new padding pixel value that represents an average pixel value.

Figure 8:
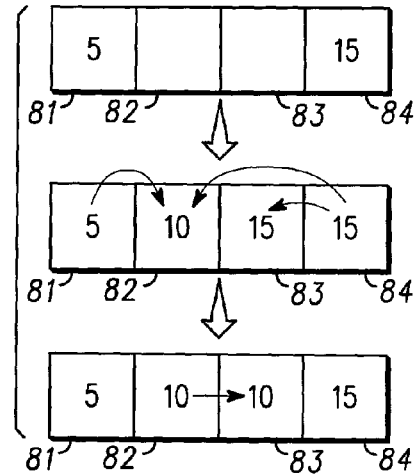
FIG. 8 comprises a detailed sequential depiction of padding in accordance with an embodiment of the invention.

When true, the present non-object pixel will be assigned 55 the average value of that adjacent pixel, hence propagating that average value. (An example of this will be made apparent below when discussing FIG. 8).

When the adjacent pixel value does not constitute an average pixel value, the process determines 56 whether adjacent pixels on both sides of the present non-object pixel comprise either an object pixel having a corresponding pixel value or a non-object pixel having a new padding pixel value. When true, the process will calculate 57 an average of those adjacent pixel values and assign 58 that average value as a new padding pixel value for the present non-object pixel. For example, and referring again to FIG. 7, the second block 72 has a pixel represented by reference numeral 78 that has horizontally adjacent pixel values on either side thereof (on the left side is a non-object pixel having a new padding pixel value of 11 and on the right side is a non-object pixel having a new padding pixel value of 21). The process calculates an average of 16 for these two pixel values and assigns this average value of 16 for this pixel 78 as depicted in the third block 73.

When the present non-object pixel has adjacent relevant pixel value immediately on only one side side thereof, the process determines 59 whether a next adjacent pixel opposite the adjacent object or padding pixel comprises either an object pixel having a corresponding pixel value or a non-object pixel having a new padding pixel value. Generally speaking, it is not necessary that next adjacent pixels on both sides of the non-object pixel need be considered. Instead, only one side or the other need be assessed (the selected side should, in general, be consistently observed). For example, as depicted earlier in FIG. 6, a next adjacent pixel "e" towards the right in a horizontal alignment and/or a next adjacent pixel "f" towards the bottom in a vertical alignment will suffice. When such is not the case, the process will assign 60 the pixel value of the adjacent pixel as a new padding pixel value for the present non-object pixel. For example, and referring momentarily to FIG. 7, the starting condition block 71 has a non-object pixel 77 that is adjacent on its left side to an object pixel having a pixel value of 24. Since there are no relevant pixel values on the opposing side of this pixel 77, this pixel 77 is assigned the pixel value of 24 as its new padding pixel value as shown in the second block 72 depiction.

When, however, a relevant next adjacent pixel does comprise either an object pixel having a corresponding pixel value or a non-object pixel having a new padding pixel value, a predetermined action 61 will be taken.

Figure 9:
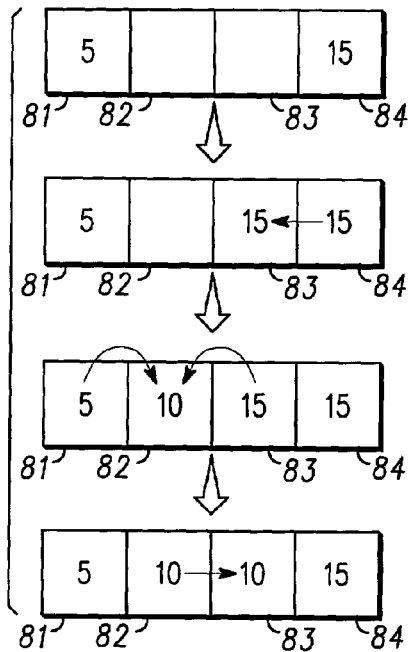
FIG. 9 comprises a detailed sequential depiction of padding in accordance with an embodiment of the invention.

In the embodiment depicted above, this predetermined action 61 will comprise not presently assigning a padding pixel value to the present non-object pixel 82. An example is shown in FIG. 9. Beginning with the same starting condition as in FIG. 8, this time, the present non-object pixel 82 will not be assigned a padding pixel value while again, the pixel 83 adjacent to the right will be assigned a new padding pixel value of 15. During the next cycle, and in accordance with the rules described above with respect to FIG. 5, the present non-object pixel 82 will be assigned a new padding pixel value of 10 (which constitutes the calculate an average of the pixel values for the adjacent pixels 81 and 83 on either side of the present non-object pixel 82). Again, with the next cycle, this average value will be propagated into the next adjacent non-object pixel space 83.

Figure 10:
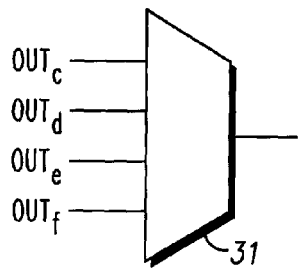
FIG. 10 comprises a detailed schematic depiction of an alteration as pertains to an alternative embodiment.

In another embodiment, an alternative approach can be taken to achieving the same result. With momentary reference to FIG. 10, the processing element of FIG. 3 can be modified such that the multiplexer 31 that previously received $out_c$ and $out_d$ can be configured to also receive $out_e$ and $out_f$ (again as corresponds to the pixel neighbor convention depicted in FIG. 6). So configured, the following table illustrates correlated relationships between various commands, variables, inputs, and outputs as pertain to this embodiment.

TABLE 2

| tate | ' | " | 4sel | | s | ' | " | comment |
|---|---|---|---|---|---|---|---|---|
| | | | | | | | | Load pixel data |
| | | | | | | | | Perform half-pel calculation |
| | | | | | | | | Motion Compensate |
| | | | | | | | | Transfer s' to s |
| | | | | | | | | Transfer s to s_start |
| | | | | | | | | Transfer out2 to out |
| | | | | | | | | not possible (undefined state) |
| | | | | | | | | Within shape (do nothing) |
| | | | | | | | | No adjacent shape pixels |
| | | | | | | | | Adjacent shape pixel (right or bottom) |
| | | | | | | | | Adjacent shape pixel (left or top) |
| | | | | | | | | Use average (even number of non-shape pixels) |
| | | | | | | | | Use average (odd number of non-shape pixels) |
| | | | | | | | | not possible (undefined state) |
| | | | | | | | | No average pixel adjacent |
| | | | | | | | | Use average on right or bottom |
| | | | | | | | | Use average on left or top |
| | | | | | | | | not possible (undefined state) |
| | | | | | | | | Average value already set (do nothing) |

So configured, the predetermined action 61 will now cause calculation of an average between the adjacent pixel value and the next adjacent pixel value and assign this average as the new padding pixel value for the present non-object pixel. For example, and referring to FIG. 8, a present non-object pixel denoted by reference numeral 82 has, on its left side, an adjacent relevant pixel 81 having a pixel value of 5. The pixel 83 adjacent on the right side has no relevant pixel value (that is, this pixel is neither an object pixel with a corresponding pixel value nor a non-object pixel with a new padding pixel value). The next adjacent pixel 84, in the predetermined direction on the predetermined side, constitutes, in this example, an object pixel having a pixel value of 15. In accordance with the process described above, the pixel 83 adjacent on the right will be assigned, during the next cycle, a pixel value of 15 as corresponds to the pixel value of its next adjacent pixel 84. The present non-object pixel 82, however, will be assigned a new padding pixel value that represents the average of the left most adjacent pixel 81 and the next adjacent pixel 84 on the predetermined side (this average value being 10 in this example). It should be noted that in the following cycle, the present non-object pixel 82 will propagate its new padding pixel value comprising an average pixel value to the non-object pixel 83 on its right in accordance with the process is described above in FIG. 5. This embodiment yields, in the end, the same pixel value assignments as the first embodiment described above.

Referring again to FIG. 5, the process eventually concludes whether it is finished 62. In one embodiment, this can be accomplished by simply counting the number of times the above process has generated and comparing that count against a predetermined value. For example, with a 16 by 16 array, 33 clock cycles are the most that would be required to fully pad the complete array with appropriate padding values. Therefore, by simply allowing the process to iterate 33 times the process can be assured of being done. In another embodiment, the process could test for a conclusion. For example, by one simple approach, a comparison could be made as between each cycle to identify when the pixel values have reached a static condition. Upon reaching a static condition, the process could again conclude that the padding was complete 63.

Once the horizontal padding is complete, the vertical padding would follow as noted earlier. To facilitate this the vertical alignment 52 would be asserted.

It should be noted that the steps depicted in FIG. 5 are intended primarily to illustrate the rules that govern the functionality of the processing element 23 depicted in FIG. 3 and the two-dimensional core architecture 21 as depicted in FIG. 2. In fact, the processing elements 23 effect all of the decision making steps depicted in FIG. 5 in a single clock cycle.

So configured, these embodiments facilitate shaped padding and/or motion compensated shaped padding with minimal hardware and greatly reduced processing requirements as measured by required clock cycles. Furthermore, this approach is readily accomplished with known integrated circuit design and fabrication techniques. These embodiments result in horizontal and vertical padding that complying with MPEG 4 standards. Other video processing that will benefit from shaped padding can similarly be facilitated through use of these embodiments as well. Various modifications, alterations, and combinations have been suggested and/or will readily occur to those skilled in the art. Such modifications, alterations, and combinations are to be considered as within the spirit and scope of the invention.

We claim:

1. A method for facilitating shape padding a video object plane disposed within a frame boundary comprising:
    providing video object plane data comprised of:
        a plurality of object pixels wherein each of the plurality of object pixels has a corresponding pixel value;
        a plurality of non-object pixels;
    selecting a grouping of the object pixels and non-object pixels;
    for a plurality of non-object pixels within the grouping, determining, substantially simultaneously, a new padding pixel value as a function of at least a neighboring pixel value.

2. The method of claim 1 wherein at least some of the non-object pixels are surrounded by object pixels.

3. The method of claim 1 wherein at least some of the non-object pixels are surrounded on at least three sides by object pixels.

4. The method of claim 1 wherein determining, substantially simultaneously, a new padding pixel value as a function of at least a neighboring pixel value includes determining, substantially simultaneously, a new padding pixel value as a function of at least a horizontally disposed neighboring pixel value.

5. The method of claim 1 wherein determining, substantially simultaneously, a new padding pixel value as a function of at least a neighboring pixel value includes determining, substantially simultaneously, a new padding pixel value as a function of at least a vertically disposed neighboring pixel value.

6. The method of claim 1 wherein determining, substantially simultaneously, a new padding pixel value as a function of at least a neighboring pixel value includes determining, substantially simultaneously, a new padding pixel value that is equal to the neighboring pixel value when the neighboring pixel value corresponds to an object pixel.

7. The method of claim 6 wherein determining, substantially simultaneously, a new padding pixel value as a function of at least a neighboring pixel value further includes determining, substantially simultaneously, a new padding pixel value that is equal to an average of new padding pixel values as previously determined for opposing but neighboring pixel values.

8. The method of claim 1 wherein determining, substantially simultaneously, a new padding pixel value as a function of at least a neighboring pixel value includes determining, substantially simultaneously, a new padding pixel value that is equal to the neighboring pixel value when the neighboring pixel value corresponds to a new padding average pixel value.

9. The method of claim 1 and further comprising motion compensating the plurality of object pixels prior to determining new padding pixel values.

10. The method of claim 1 wherein selecting a grouping of the object pixels and non-object pixels includes loading pixel values that correspond to the grouping of object pixels and non-object pixels into an array of processing elements.

11. The method of claim 10 and further comprising motion compensating the pixel values as loaded into the array of processing elements.

12. A method for facilitating MPEG 4 shape padding of a video object plane disposed within a frame boundary comprising:
    providing video object plane data comprised of:
        a plurality of state pixels wherein each of the plurality of state pixels has a corresponding pixel value;
        a plurality of non-state pixels;
    selecting a macro block comprising a grouping of the state pixels and non-state pixels;
    for each of the non-state pixels, determining, substantially simultaneously, whether to assign a new padding pixel value to the non-state pixel.

13. The method of claim 10 wherein determining, substantially simultaneously, whether to assign a new padding pixel value to the non-state pixel includes determining whether to assign a new padding pixel value to the non-state pixel as a function, at least in part, of padding pixel values of neighboring pixels.

14. The method of claim 13 wherein determining whether to assign a new padding pixel value to the non-state pixel as a function, at least in part, of padding pixel values of neighboring pixels includes determining whether to assign a new padding pixel value to the non-state pixel as a function, at least in part, of padding pixel values of horizontally neighboring pixels.

15. The method of claim 14 and further comprising repeatedly determining whether to assign a new padding pixel value to the non-state pixels as a function, at least in part, of padding pixel values of horizontally neighboring pixels until all non-state pixels have an appropriate horizontally assigned new padding pixel value.

16. The method of claim 15 wherein repeatedly determining whether to assign a new padding pixel value to the non-state pixels as a function, at least in part, of padding pixel values of horizontally neighboring pixels until all non-state pixels have an appropriate horizontally assigned new padding pixel value includes detecting when all non-state pixels have an appropriate horizontally assigned new padding pixel value.

17. The method of claim 15 wherein repeatedly determining whether to assign a new padding pixel value to the non-state pixels comprises repeatedly determining whether to assign a new padding pixel value to the non-state pixels a predetermined number of repetitions.

18. The method of claim 17 and further comprising, following horizontal assignment of new padding pixel values, for each non-state pixel not having a horizontally assigned new padding pixel value, determining, substantially simultaneously, whether to assign a new padding pixel value to the non-state pixel as a function, at least in part, of padding pixel values of vertically neighboring pixels.

19. A method for facilitating shape padding of a video object plane disposed within a frame boundary comprising:
providing video object plane data comprised of:
a plurality of state pixels wherein each of the plurality of state pixels has a corresponding pixel value;
a plurality of non-state pixels;
selecting a grouping of the state pixels and non-state pixels;
for each of the non-state pixels, within a single action cycle and as repeated at least until done:
assigning a padding pixel value that is equal to the pixel value for a first horizontally adjacent pixel having a pixel value that corresponds to either of a state pixel or a new padding pixel value, unless:
a second horizontally adjacent pixel located on an opposite side of the non-state pixel from the first horizontally adjacent pixel has a pixel value that corresponds to either a state pixel or a new padding pixel value, in which case the non-state pixel is assigned a padding pixel value representing an average of the pixel value for the first horizontally adjacent pixel and the second horizontally adjacent pixel;
a second horizontally adjacent pixel located on a first predetermined side of the non-state pixel and on an opposite side of the non-state pixel from the first horizontally adjacent pixel has a pixel value that is neither a pixel value for a state pixel nor a new padding pixel value, and another horizontally aligned pixel is located adjacent to the second horizontally adjacent pixel and on an opposite side of the second horizontally adjacent pixel from the non-state pixel wherein the another horizontally aligned pixel has a pixel value representing either a state pixel or a new padding pixel value, in which case a first predetermined action is taken;
for each of the non-state pixels not yet assigned a padding pixel value, within a single action cycle and as repeated at least until done:
assigning a padding pixel value that is equal to the pixel value for a first vertically adjacent pixel having a pixel value that corresponds to either of a state pixel or a new padding pixel value, unless:
a second vertically adjacent pixel located on an opposite side of the non-state pixel from the first vertically adjacent pixel has a pixel value that corresponds to either a state pixel or a new padding pixel value, in which case the non-state pixel is assigned a padding pixel value representing an average of the pixel value for the first vertically adjacent pixel and the second vertically adjacent pixel;
a second vertically adjacent pixel located on a first predetermined side of the non-state pixel and on an opposite side of the non-state pixel from the first vertically adjacent pixel has a pixel value that is neither a pixel value for a state pixel nor a new padding pixel value, and another vertically aligned pixel is located adjacent to the second vertically adjacent pixel and on an opposite side of the second vertically adjacent pixel from the non-state pixel wherein the another vertically aligned pixel has a pixel value representing either a state pixel or a new padding pixel value, in which case a second predetermined action is taken;
the non-state pixel is vertically adjacent to a pixel having a padding pixel value that represents an average pixel value, in which case the non-state pixel is assigned the padding pixel value that represents an average pixel value.

20. The method of claim 19 wherein:
the first predetermined action includes assigning the non-state pixel a padding pixel value representing an average of the pixel value for the first horizontally adjacent pixel and the another horizontally aligned pixel; and
the second predetermined action includes assigning the non-state pixel a padding pixel value representing an average of the pixel value for the first vertically adjacent pixel and the another vertically aligned pixel.

21. The method of claim 19 wherein:
the first predetermined action includes not presently assigning the non-state pixel a padding pixel value; and
the second predetermined action includes not assigning the non-state pixel a padding pixel value.

22. The method of claim 19 wherein:
the first predetermined action includes assigning the non-state pixel an intermediary padding pixel value; and
the second predetermined action includes assigning the non-state pixel an intermediary padding pixel value.

23. The method of claim 19 wherein selecting a grouping of the state pixels and non-state pixels includes loading pixel values that correspond to the grouping of state pixels and non-state pixels into an array of processing elements.

24. The method of claim 23 and further comprising motion compensating the pixel values as loaded into the array of processing elements.

25. The method of claim 24 wherein loading pixel values that correspond to the grouping of state pixels and non-state pixels into an array of processing elements includes loading pixel elements that correspond to the grouping of state pixels and non-state pixels into a 16 by 16 array of processing elements.

* * * * *